United States Patent
Hsueh et al.

(10) Patent No.: US 10,754,805 B1
(45) Date of Patent: Aug. 25, 2020

(54) USB ADAPTER

(71) Applicant: Primax Electronics Ltd., Taipei (TW)

(72) Inventors: Tsung-Wen Hsueh, Taipei (TW); Yi-Guang Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/582,600

(22) Filed: Sep. 25, 2019

(30) Foreign Application Priority Data

Jul. 26, 2019 (TW) .............................. 108126600 A

(51) Int. Cl.
*G06F 13/38* (2006.01)
*G06F 13/376* (2006.01)

(52) U.S. Cl.
CPC .......... *G06F 13/382* (2013.01); *G06F 13/376* (2013.01); *G06F 2213/0042* (2013.01)

(58) Field of Classification Search
None
See application file for complete search history.

*Primary Examiner* — Scott C Sun
(74) *Attorney, Agent, or Firm* — Kirton McConkie; Evan R. Witt

(57) ABSTRACT

A USB adapter includes a first interface connector, a second interface connector, a third interface port and a detecting module. When both of the first interface connector and the second interface connector are plugged into a first electronic device, the USB adapter can acquire higher amount of electricity. Consequently, the sufficient electricity can be provided. Moreover, the detecting module detects a connection status of at least one of the first interface connector and the second interface connector. According to the detecting result, a single default function or plural default functions are enabled.

9 Claims, 4 Drawing Sheets

USB ADAPTER

FIELD OF THE INVENTION

The present invention relates to an adapter, and more particularly to a USB adapter for connecting USB-C device to USB-A device.

BACKGROUND OF THE INVENTION

Nowadays, the functions of various electronic products become more powerful. Since handheld devices are increasingly popular, the demands on the data transmission between various electronic products or handheld devices are increased. As the volume of the electronic product or the handheld device is gradually reduced, there is a need of installing more connecting interfaces (e.g. connectors or the complementary connectors) on the casing's peripheral profile (also referred as a casing's coastline) of the electronic product or the handheld device so as to exchange signals between different devices. For example, the connector is an electrical plug, and the complementary connector is an electrical receptacle (also referred as a connecting port).

Nowadays, the connectors with universal serial bus (USB) interfaces become the mainstream of the commercially available connectors. According to specifications, the connectors with the USB interfaces are classified into three types, including a USB Type-A (or USB-A) connector, a USB Type-B (or USB-B) connector and a USB Type-C (or USB-C) connector. Nowadays, the USB-A ports of most electronic devices comply with the USB 3.0 communication standard. Generally, the electronic device with the USB 3.0 interface is only able to provide a current of about 900 mA. As known, the use of a single USB-A connector cannot provide sufficient electricity to the high power consumption device.

On the other hand, USB-C interfaces are designed according to the USB 3.1 communication standard. The USB-C interface can withstand the current of 5 ampere (A) at 20V and transfer the electric power of 100 W. Especially, when the USB-C interface is applied to the USB power delivery (USB PD) technology, the USB-C interface can support the charging/discharging functions in the voltage range between 5V and 20V and in the current range between 0V and 5V. Moreover, the magnitudes of the voltage and the matching current may be selected according to the practical requirements. In other words, the USB-C connector can provide more electricity. Consequently, most novel electronic devices use USB-C connectors as the charging interfaces.

Since the USB ports of most electronic devices (e.g., computer hosts) are USB-A ports, some drawbacks occur. For example, the electronic devices with the USB-C ports are not popular. For connecting the electronic device with the USB-C connector to another electronic device with the USB-A port, an additional USB-C to USB-A adapter is necessary. However, even if the USB-C to USB-A adapter is employed, the electronic device with the USB-A port is only able to output or receive the lower current (e.g., 900 mA). In other words, the commercially available USB-C to USB-A adapter cannot provide sufficient electricity.

SUMMARY OF THE INVENTION

An object of the present invention provides a USB adapter for providing sufficient electricity.

Another object of the present invention provides a USB adapter capable of enabling or disabling a specified function according to the practical requirements.

In accordance with an aspect of the present invention, a USB adapter is provided. The USB adapter is connected with a first electronic device and a second electronic device. The USB adapter includes a first interface connector, a second interface connector, a third interface port and a detecting module. The first interface connector is selectively connected with a first interface port of the first electronic device. The second interface connector is selectively connected with a second interface port of the first electronic device. The third interface port is connected with the first interface connector, the second interface connector and a third interface connector of the second electronic device. The detecting module is connected with the third interface port, and connected with a fixed resistor of the second electronic device through the third interface port and the third interface connector. The detecting module detects a connection status of at least one of the first interface connector and the second interface connector. The detecting module includes a sensing circuit and a judging unit. The sensing circuit is connected with the third interface port, and connected with the fixed resistor through the third interface port and the third interface connector. An equivalent voltage division circuit is defined by the sensing circuit and the fixed resistor collaboratively. The judging unit is connected with the sensing circuit and at least one configuration channel pin of the third interface port. The judging unit judges the connection status of the at least one of the first interface connector and the second interface connector according to a voltage value of the at least one configuration channel pin.

In an embodiment, the sensing circuit includes a first resistor, a second resistor and a forward conduction element. The first resistor is electrically connected with a first power input terminal. The second resistor is electrically connected with a second power input terminal, and connected with the first resistor in parallel. The forward conduction element is electrically connected with the first resistor and the second resistor. By the forward conduction element, a current flowing through the first resistor does not return back to the second power input terminal. The equivalent voltage division circuit is defined by at least one of the first resistor and the second resistor and the fixed resistor collaboratively.

If the voltage value of the at least one configuration channel pin is within a first voltage range, the judging unit judges that the first interface connector is electrically connected with the first interface port and the second interface connector is electrically connected with the second interface port. If the voltage value of the at least one configuration channel pin is within a second voltage range, the judging unit judges that the first interface connector is electrically connected with the first interface port but the second interface connector is not electrically connected with the second interface port. If the voltage value of the at least one configuration channel pin is within a third voltage range, the judging unit judges that the second interface connector is electrically connected with the second interface port but the first interface connector is not electrically connected with the first interface port.

In an embodiment, the voltage value of the at least one configuration channel pin is determined according to the equivalent voltage division circuit. If the first resistor, the second resistor and the fixed resistor are connected with each other in parallel with each other to define the equivalent voltage division circuit, the voltage value of the at least one configuration channel pin is within the first voltage range. If the first resistor and the fixed resistor are connected with each other in parallel with each other to define the equivalent voltage division circuit, the voltage value of the at least one configuration channel pin is within the second voltage range. If the second resistor and the fixed resistor are connected with each other in parallel with each other to define the equivalent voltage division circuit, the voltage value of the at least one configuration channel pin is within the third voltage range.

From the above descriptions, the present invention provides a USB adapter. When both of the first interface connector and the second interface connector are plugged into the power-providing electronic device, the USB adapter can acquire higher amount of electricity. Consequently, the sufficient electricity can be provided. Moreover, by detecting the connection statuses of the first interface connector and the second interface, the corresponding default functions will be enabled. For example, when only the first interface connector or the second interface connector is plugged into the electronic device, a single default function is enabled. Consequently, the power consumption is lower. When both of the first interface connector and the second interface connector are plugged into the electronic device, plural default functions are enabled. In other words, the USB adapter can automatically enable the loadable default function according to the power supply condition.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
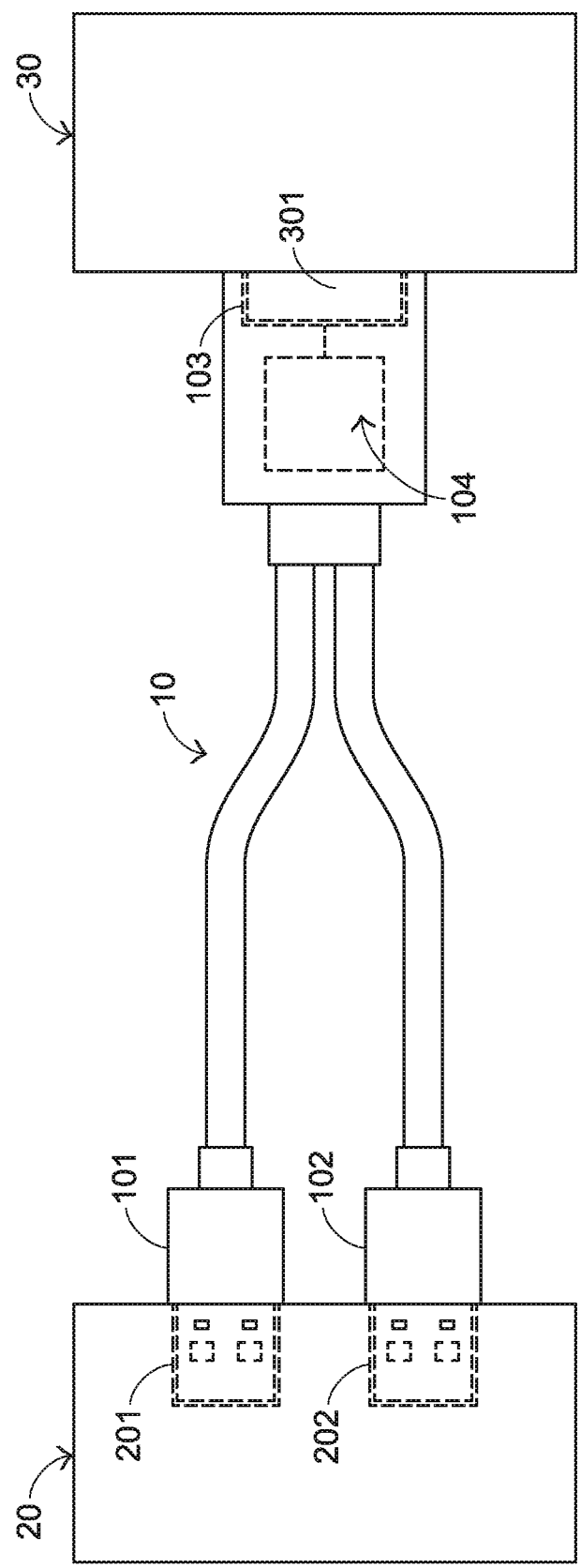
FIG. 1 schematically illustrates the structure of a USB adapter according to an embodiment of the present invention, in which the USB adapter is connected with a first electronic device and a second electronic device.
Figure 2:
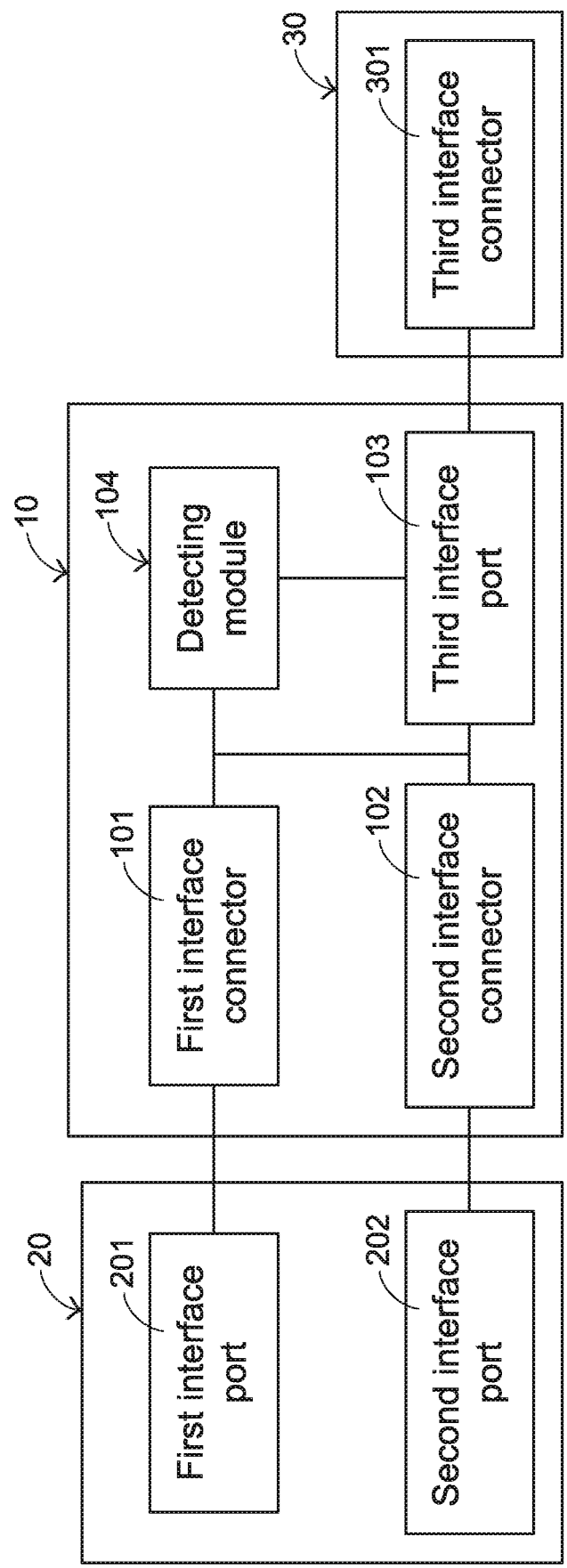
FIG. 2 is a schematic functional block diagram illustrating the relationships between the USB adapter of the present invention, the first electronic device and the second electronic device.

The present invention provides a USB adapter to overcome the drawbacks of the conventional technologies. Please refer to FIGS. 1 and 2. FIG. 1 schematically illustrates the structure of a USB adapter according to an embodiment of the present invention, in which the USB adapter is connected with a first electronic device and a second electronic device. FIG. 2 is a schematic functional block diagram illustrating the relationships between the USB adapter of the present invention, the first electronic device and the second electronic device. As shown in FIGS. 1 and 2, the USB adapter 10 is connected with the first electronic device 20 and the second electronic device 30. The USB adapter 10 comprises a first interface connector 101, a second interface connector 102, a third interface port 103 and a detecting module 104. The first electronic device 20 comprises a first interface port 201 corresponding to the first interface connector 101 and a second interface port 202 corresponding to the second interface connector 102. The second electronic device 30 comprises a third interface connector 301 corresponding to the third interface port 103. In an embodiment, the first electronic device 20 is a computer host, and the second electronic device 30 is an input device with a specified function. For example, the second electronic device 30 is a gaming mouse, a gaming mouse pad or a gaming keyboard.

The second electronic device 30 is electrically connected with the first electronic device 20 through the USB adapter 10. The first electronic device 20 is electrically connected with the USB adapter 10 through the third interface connector 301 and the third interface port 103. The first electronic device 20 is electrically connected with the USB adapter 10 through the first interface port 201, the second interface port 202, the first interface connector 101 and the second interface connector 102.

In an embodiment, the first interface connector 101 and the second interface connector 102 are USB-A plugs, and the third interface port 103 is a USB-C receptacle. The first interface port 201 and the second interface port 202 are USB-A receptacles corresponding to the USB-A plugs. The third interface connector 301 is a USB-C plug corresponding to the USB-C receptacle.

Figure 3:
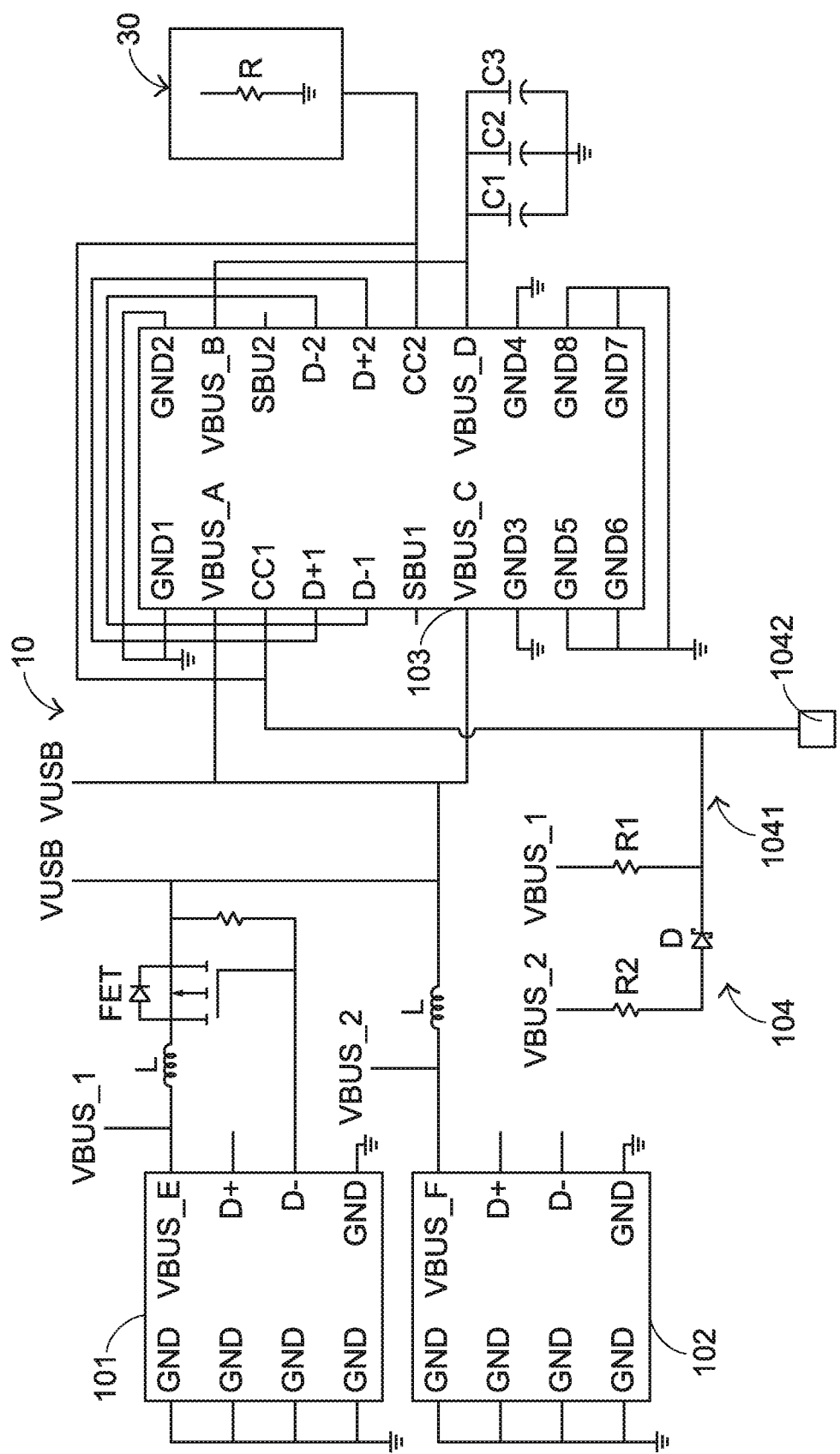
FIG. 3 is a schematic circuit diagram illustrating a portion of the USB adapter of the present invention and the second electronic device.

Please refer to FIGS. 1, 2 and 3. FIG. 3 is a schematic circuit diagram illustrating a portion of the USB adapter of the present invention and the second electronic device. The detecting module 104 is connected with the third interface port 103. Moreover, the detecting module 104 is connected with a fixed resistor R of the second electronic device 30 through the third interface port 103 and the third interface connector 301. The detecting module 104 is used for detecting the connection status of at least one of the first interface connector 101 and the second interface connector 102. The detecting module 104 comprises a sensing circuit 1041 and a judging unit 1042. The sensing circuit 1041 is connected with the third interface port 103. The sensing circuit 1041 is connected with the fixed resistor R of the second electronic device 30 through the third interface port 103 and the third interface connector 301. Moreover, an equivalent voltage division circuit is defined by the sensing circuit 1041 and the fixed resistor R collaboratively. The judging unit 1042 is connected with the sensing circuit 1041 and a first configuration channel pin CC1 and a second configuration channel pin CC2 of the third interface port 103. According to the voltage value of the first configuration channel pin CC1 or the second configuration channel pin CC2, the judging unit 1042 judges the connection status of at least one of the first interface connector 101 and the second interface connector 102. The second configuration channel pin CC2 is electrically connected with the first configuration channel pin CC1. The sensing circuit 1041 is electrically connected with the first configuration channel pin CC1 and the second configuration channel pin CC2.

Please refer to FIG. 3. The sensing circuit 1041 comprises a first resistor R1, a second resistor R2 and a forward conduction element D. The first resistor R1 is electrically connected with a first power input terminal VBUS_1. The second resistor R2 is electrically connected with a second power input terminal VBUS_2. The second resistor R2 and the first resistor R1 are connected with each other in parallel. The resistance of the first resistor R1 and the resistance of the second resistor R2 are different. The forward conduction element D is electrically connected with the first resistor R1 and the second resistor R2. By the forward conduction element D, the current flowing through the first resistor R1 will not return back to the second power input terminal VBUS_2. The equivalent voltage division circuit is defined by at least one of the first resistor R1 and the second resistor R2 and the fixed resistor R collaboratively. Moreover, the components of the equivalent voltage division circuit are determined according to the connection statuses of the first interface connector 101 and the second interface connector 102. In an embodiment, the forward conduction element D is a diode or a Schottky diode.

Figure 4A:
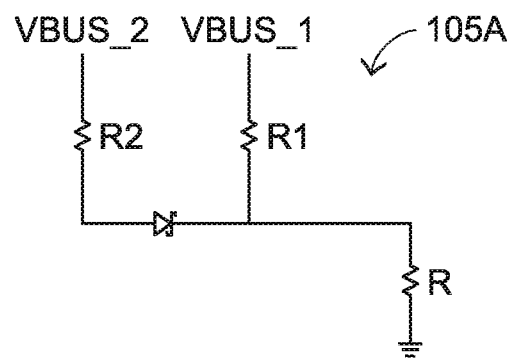
FIGS. 4A, 4B and 4C are schematic circuit diagrams illustrating some operating conditions of the equivalent voltage division circuit defined by the USB adapter and the second electronic device.
Figure 4B:
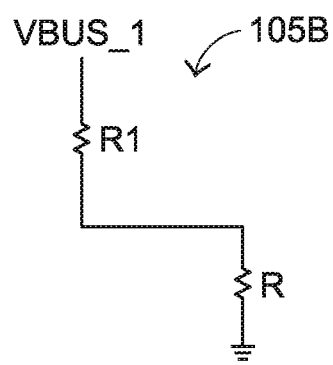
Figure 4C:
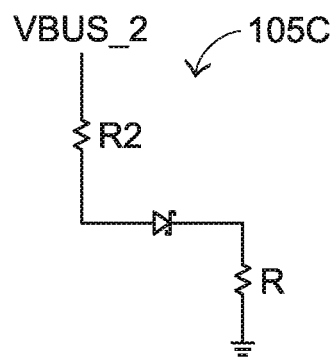

Hereinafter, some operating conditions of the equivalent voltage division circuit will be illustrated with reference to FIGS. 1, 4A, 4B and 4C. FIGS. 4A, 4B and 4C are schematic circuit diagrams illustrating some operating conditions of the equivalent voltage division circuit defined by the USB adapter and the second electronic device.

Please refer to FIG. 4A. The first interface connector 101 is electrically connected with the first interface port 201. The second interface connector 102 is electrically connected with the second interface port 202. The third interface connector 301 is electrically connected with the third interface port 103. Under this circumstance, the first resistor R1, the second resistor R2 and the fixed resistor R are connected with each other in parallel with each other to define the equivalent voltage division circuit 105A.

Please refer to FIG. 4B. The first interface connector 101 is electrically connected with the first interface port 201. The third interface connector 301 is electrically connected with the third interface port 103. However, the second interface connector 102 is not electrically connected with the second interface port 202. Under this circumstance, the first resistor R1 and the fixed resistor R are connected with each other in parallel with each other to define the equivalent voltage division circuit 105B.

Please refer to FIG. 4C. The second interface connector 102 is electrically connected with the second interface port 202. The third interface connector 301 is electrically connected with the third interface port 103. However, the first interface connector 101 is not electrically connected with the first interface port 201. Under this circumstance, the second resistor R2 and the fixed resistor R are connected with each other in parallel with each other to define the equivalent voltage division circuit 105C.

As mentioned above, the equivalent voltage division circuit has various circuitries. According to the voltage division principle, the first configuration channel pin CC1 (or the second configuration channel pin CC2) generates different voltage values.

In the equivalent voltage division circuit 105A of FIG. 4A, the voltage value of the first configuration channel pin CC1 is within a first voltage range. In the equivalent voltage division circuit 105B of FIG. 4B, the voltage value of the first configuration channel pin CC1 is within a second voltage range. In the equivalent voltage division circuit 105C of FIG. 4C, the voltage value of the first configuration channel pin CC1 is within a third voltage range. According to the detected voltage value, the judging unit 1042 judges the connection status of at least one of the first interface connector 101 and the second interface connector 102. The first configuration channel pin CC1 and the second configuration channel pin CC2 comply with the specifications of the USB-C interface. The structures and operations of the first configuration channel pin CC1 and the second configuration channel pin CC2 are well known to those skilled in the art, and are not redundantly described herein.

The operations of the USB adapter 10 will be described in more details as follows.

Firstly, a first default function and a second default function of the second electronic device 30 are set. For example, the first default function is a wireless charging function, and the second default function is an illuminating function. Please refer to FIGS. 1, 2, 3, 4A, 4B and 4C again. For connecting the second electronic device 30 to the first electronic device 20, it is necessary to use the USB adapter 10 to establish the electric connection between the first electronic device 20 and the second electronic device 30.

After the third interface connector 301 is plugged into the third interface port 103 and the first interface connector 101 is plugged into the first interface port 201, the equivalent voltage division circuit 105B as shown in FIG. 4B is formed by the USB adapter 10, the first electronic device 20 and the second electronic device 30 collaboratively. Consequently, the voltage of the first configuration channel pin CC1 is within the second voltage range. According to the voltage value within the second voltage range, the judging unit 1042 realizes that the second electronic device 30 can acquire the electric power through the first interface connector 101 and the first interface port 201. Consequently, the judging unit 1042 enables the first default function only.

Similarly, after the third interface connector 301 is plugged into the third interface port 103 and the second interface connector 102 is plugged into the second interface port 202, the equivalent voltage division circuit 105C as shown in FIG. 4C is formed by the USB adapter 10, the first electronic device 20 and the second electronic device 30 collaboratively. Consequently, the voltage of the first configuration channel pin CC1 is within the third voltage range. According to the voltage value within the third voltage range, the judging unit 1042 realizes that the second electronic device 30 can acquire the electric power through the second interface connector 102 and the second interface port 202. Consequently, the judging unit 1042 enables the second default function only.

Similarly, after the third interface connector 301 is plugged into the third interface port 103, the first interface connector 101 is plugged into the first interface port 201 and the second interface connector 102 is plugged into the second interface port 202, the equivalent voltage division circuit 105A as shown in FIG. 4A is formed by the USB adapter 10, the first electronic device 20 and the second electronic device 30 collaboratively. Consequently, the voltage of the first configuration channel pin CC1 is within the first voltage range. According to the voltage value within the first voltage range, the judging unit 1042 realizes that the second electronic device 30 can acquire the electric power through the first interface connector 101, the first interface port 201, the second interface connector 102 and the second interface port 202. Consequently, the judging unit 1042 enables both of the first default function and the second default function.

The following two aspects should be specially described. Firstly, the USB adapter of the present invention comprises two USB-A plugs. It is noted that the number of the USB-A plugs is not restricted. For example, in another embodiment, the USB adapter comprises three USB-A plugs or more than three USB-A plugs. Secondly, plural power pins (e.g., VBUS_A, VBUS_B, VBUS1, VBUS2, VBUS3 and VBUS4), plural signal pins (e.g., D+, D−, D+1, D−1, D+2, D−2) and auxiliary signal pins SBU of the first interface connector 101, the second interface connector 102 and the third interface port 103, a transistor FET, a ground terminal GND, inductors L, a filtering module with capacitors C1, C2 and C3 and associated components are shown in FIG. 3. These components are not the subjects of the present invention. The operations of these components are well known to those skilled in the art, and are not redundantly described herein.

From the above descriptions, the present invention provides a USB adapter. When both of the first interface connector and the second interface connector are plugged into the power-providing electronic device, the USB adapter can acquire higher amount of electricity. Consequently, the sufficient electricity can be provided. Moreover, by detecting the connection statuses of the first interface connector and the second interface, the corresponding default functions will be enabled. For example, when only the first interface connector or the second interface connector is plugged into the electronic device, a single default function is enabled. Consequently, the power consumption is lower. When both of the first interface connector and the second interface connector are plugged into the electronic device, plural default functions are enabled. In other words, the USB adapter can automatically enable the loadable default function according to the power supply condition.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A USB adapter connected with a first electronic device and a second electronic device, the USB adapter comprising:
   a first interface connector selectively connected with a first interface port of the first electronic device;
   a second interface connector selectively connected with a second interface port of the first electronic device;
   a third interface port connected with the first interface connector, the second interface connector and a third interface connector of the second electronic device; and
   a detecting module connected with the third interface port, and connected with a fixed resistor of the second electronic device through the third interface port and the third interface connector, wherein the detecting module detects a connection status of at least one of the first interface connector and the second interface connector, and the detecting module comprises:
      a sensing circuit connected with the third interface port, and connected with the fixed resistor through the third interface port and the third interface connector, wherein an equivalent voltage division circuit is defined by the sensing circuit and the fixed resistor collaboratively; and
      a judging unit connected with the sensing circuit and at least one configuration channel pin of the third interface port, wherein the judging unit judges the connection status of the at least one of the first interface connector and the second interface connector according to a voltage value of the at least one configuration channel pin.

2. The USB adapter according to claim 1, wherein the sensing circuit comprises:
   a first resistor electrically connected with a first power input terminal;
   a second resistor electrically connected with a second power input terminal, and connected with the first resistor in parallel; and
   a forward conduction element electrically connected with the first resistor and the second resistor, wherein by the forward conduction element, a current flowing through the first resistor does not return back to the second power input terminal,
   wherein the equivalent voltage division circuit is defined by at least one of the first resistor and the second resistor and the fixed resistor collaboratively.

3. The USB adapter according to claim 2, wherein if the voltage value of the at least one configuration channel pin is within a first voltage range, the judging unit judges that the first interface connector is electrically connected with the first interface port and the second interface connector is electrically connected with the second interface port, wherein if the voltage value of the at least one configuration channel pin is within a second voltage range, the judging unit judges that the first interface connector is electrically connected with the first interface port but the second interface connector is not electrically connected with the second interface port, wherein if the voltage value of the at least one configuration channel pin is within a third voltage range, the judging unit judges that the second interface connector is electrically connected with the second interface port but the first interface connector is not electrically connected with the first interface port.

4. The USB adapter according to claim 3, wherein the voltage value of the at least one configuration channel pin is determined according to the equivalent voltage division circuit, wherein if the first resistor, the second resistor and the fixed resistor are connected with each other in parallel with each other to define the equivalent voltage division circuit, the voltage value of the at least one configuration channel pin is within the first voltage range, wherein if the first resistor and the fixed resistor are connected with each other in parallel with each other to define the equivalent voltage division circuit, the voltage value of the at least one configuration channel pin is within the second voltage range, wherein if the second resistor and the fixed resistor are connected with each other in parallel with each other to define the equivalent voltage division circuit, the voltage value of the at least one configuration channel pin is within the third voltage range.

5. The USB adapter according to claim 2, wherein if the voltage value of the at least one configuration channel pin is within a first voltage range, the judging unit enables a first default function and a second default function, wherein if the voltage value of the at least one configuration channel pin is within a second voltage range, the judging unit enables the first default function, wherein if the voltage value of the at least one configuration channel pin is within a third voltage range, the judging unit enables the second default function.

6. The USB adapter according to claim 5, wherein the voltage value of the at least one configuration channel pin is determined according to the equivalent voltage division circuit, wherein if the first resistor, the second resistor and the fixed resistor are connected with each other in parallel with each other to define the equivalent voltage division circuit, the voltage value of the at least one configuration channel pin is within the first voltage range, wherein if the first resistor and the fixed resistor are connected with each other in parallel with each other to define the equivalent voltage division circuit, the voltage value of the at least one configuration channel pin is within the second voltage range, wherein if the second resistor and the fixed resistor are connected with each other in parallel with each other to define the equivalent voltage division circuit, the voltage value of the at least one configuration channel pin is within the third voltage range.

7. The USB adapter according to claim 1, wherein at least one configuration channel pin comprises a first configuration channel pin and a second configuration channel pin, wherein the second configuration channel pin is electrically connected with the first configuration channel pin, and the sensing circuit is electrically connected with the first configuration channel pin and the second configuration channel pin.

8. The USB adapter according to claim 1, wherein the first interface connector and the second interface connector are USB-A plugs, and the third interface port is a USB-C receptacle.

9. The USB adapter according to claim 2, wherein the forward conduction element is a diode or a Schottky diode.

* * * * *